(No Model.)

B. F. PARKES.
COMBINED PLOW AND SEEDER.

No. 369,409. Patented Sept. 6, 1887.

Witnesses,
Geo. H. Strong.

Inventor,
B. F. Parkes
By Dewey & Co.
attys

N. PETERS, Photo-Lithographer, Washington, D. C.

United States Patent Office.

BENJAMIN F. PARKES, OF FRESNO, CALIFORNIA.

COMBINED PLOW AND SEEDER.

SPECIFICATION forming part of Letters Patent No. 369,409, dated September 6, 1887.

Application filed June 11, 1887. Serial No. 241,083. (No model.)

*To all whom it may concern:*

Be it known that I, BENJAMIN F. PARKES, of Fresno, county of Fresno, State of California, have invented an Improvement in Combined Plow and Seeder; and I hereby declare the following to be a full, clear, and exact description of the same.

My invention relates to a combined apparatus by which the ground may be properly prepared and seed sown at a single operation.

It consists of a gang-plow having the triangular frame arranged to travel with the shorter rectangular side to the front, while the plows are supported from the diagonal beam, the whole traveling upon wheels which allow the plows to be adjusted, and in combination therewith of a seeding apparatus partly supported from the rear of the plow-frame and partly supported upon an independent wheel, all of which will be more fully described in the accompanying drawings, in which—

Figure 1:
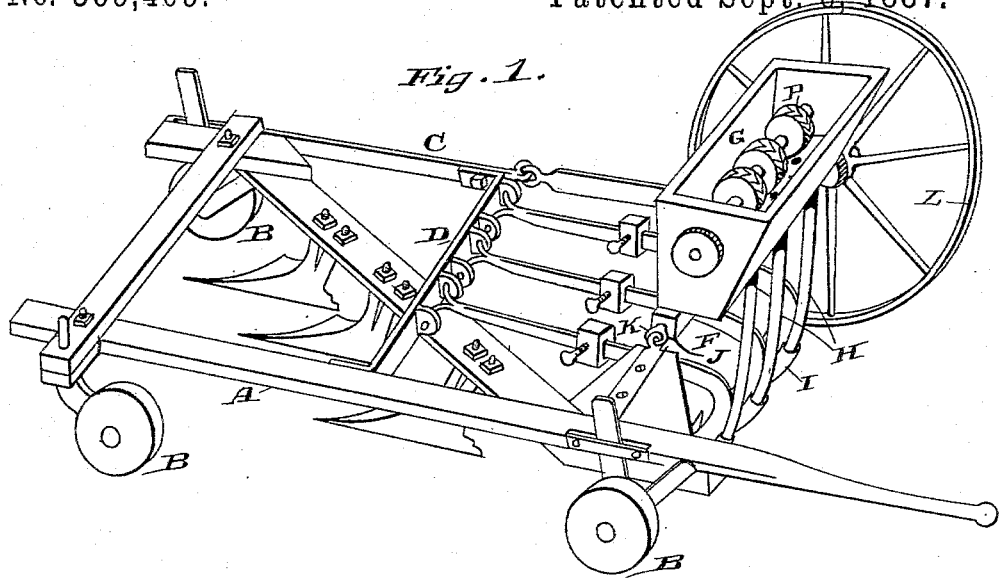
Figure 2:
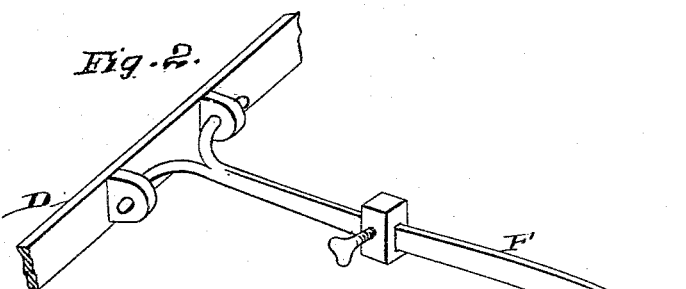
Figure 3:
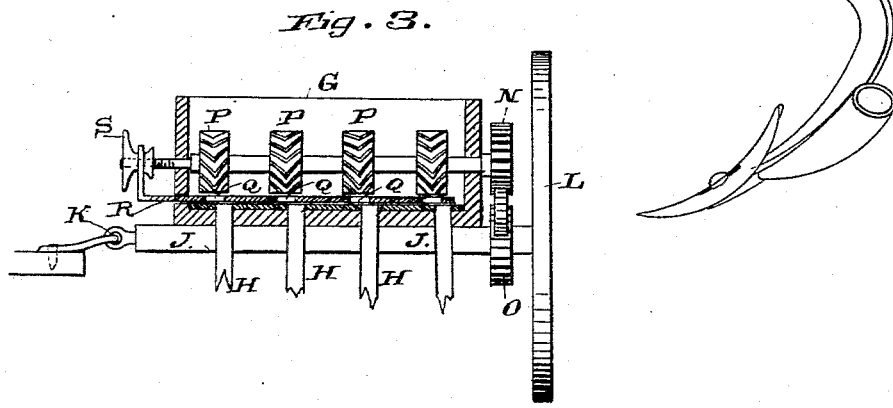

Figure 1 is a view of my plow and seeder. Fig. 2 is an enlarged view of one of the drill-plows. Fig. 3 is a longitudinal section of the seed-box.

A is a plow-frame of the pattern which is known as the "Stockton Gang-Plow," having two sides at right angles with each other, the shorter side traveling toward the front, and a diagonal side to which the plows, which may be four or more in number, are attached. This frame is supported upon bearing-wheels B, which are adjustable in the usual manner to raise or lower the plows.

Across the frame, parallel with the front timber, extends a bar, D, one end of which is secured to the long beam of the frame, and the other is connected with the short side by a bar or brace, C, which assists in supporting it. The transverse bar D is also braced or supported from the diagonal plow-beam, so that it is held rigidly in place. Upon the rear of this bar, are eyes, to which are hinged the curved drill, forming plows F, these bars being attached to the bar so that they may move up and down independently, and their points which enter the ground will follow the irregularities, serving to harrow the ground which has been plowed and at the same time to form drills, into which the seed passes from the seed-box G, through the pipes H, which are connected with short tubes or channels I upon the rear of the drill-plows.

The seed-box is supported upon a beam, J, which is fixed to the rear portion parallel with the front of the plow, and has one end hinged to the rear portion at K, as shown. The opposite end is supported upon a large wheel, L, and is connected with the front by a hinged link. It thus has a movement independent of the plow-frame, so as to adjust itself to the irregularities of the surface.

The wheel L carries a gear-wheel upon its shaft, and this connects with the gear-wheels N and O, so as to drive the shaft which passes through the interior of the feed-box. This shaft has mounted upon it disks P, which have the V-shaped grooves or channels formed in the periphery. These disks stand above the holes Q in the bottom of the seed-box, through which the grain passes and enters the tubes H, which lead it to the drills, and the disks serve to keep the grain stirred up and to regulate the quantity which passes through these holes. A sliding valve or gate, R, moves across these openings, so as to adjust the amount of opening, and this is controlled by a screw or nut, S, having a groove or channel around its hub, into which the forked part of the upturned end of the slide engages, so that the slide is moved by turning the nut backward or forward. By this construction I am enabled to plow, harrow, and seed the ground rapidly and at a single operation.

The independent movement of the drill-forming plows, which also act to harrow the ground as well as form drills for the reception of the seed, and the seeder mounted so as to have an independent movement, by reason of its hinged joint and supplemental wheel, produce very efficient work.

Having thus described my invention, what I claim as new, and desire to secure by Letters Patent, is—

1. The combination, in a single machine, of a gang-plow constructed as shown, and a seeder supported from its rear end by means of the hinged bar or frame and supplemental independent wheel, substantially as described.

2. The gang-plow having a transverse supplemental bar across its central portion and the drill-forming plows hinged to the same, so as to have an independent movement, substantially as described.

3. A plow constructed as shown, having the independently-moving hinged drill-forming plows hinged to it, in combination with the seeder supported from the rear of the plow-frame and having tubes leading from the seed-box to the rear of the drill-formers, substantially as described.

4. A seed-box supported upon the horizontal transverse bar, having one end hinged to the plow-frame, the other supported upon an independent bearing-wheel, and connected with the front of the plow-frame by a jointed link or bar, as shown, in combination with the drill-formers and the tubes connecting the seed-boxes with these drill-formers, substantially as herein described.

5. The gang-plow having a triangular frame and supporting-wheels, and the transverse bar, to which are hinged the drill-forming plows, in combination with the seed-box mounted upon a supplemental bar having one end hinged to the rear of the main frame, and the other connected by a hinged link to the front, and supported by an independent traveling wheel with gearing by which the disk-shaft extending through the seed-box is driven, substantially as described.

6. The seed-box mounted upon the plow-frame, with its hinged supporting-frame and independent wheel and gearing, in combination with the disks having the V-shaped grooves or channels upon the periphery, the seed-discharge openings in the bottom of the box, and the adjustable slide by which the openings are controlled, substantially as described.

In witness whereof I hereunto set my hand.

BENJAMIN F. PARKES.

Witnesses:
J. P. VINCENT,
J. D. REYBURN.